Figure 1:
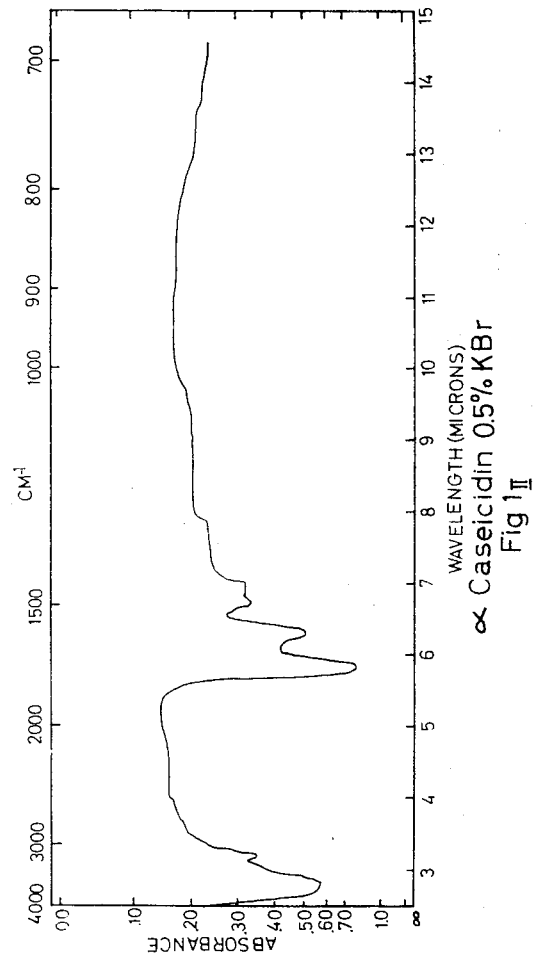
Figure 1:
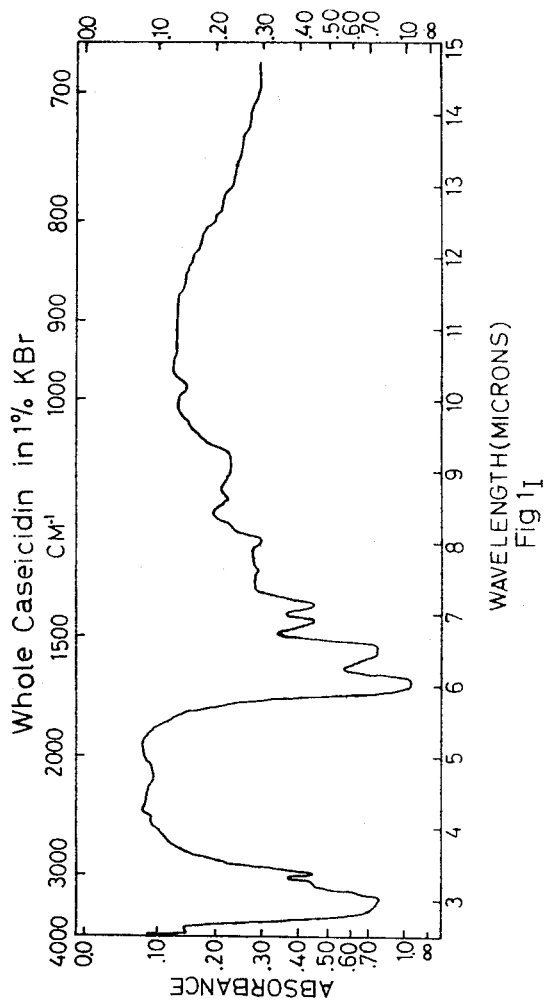

United States Patent [19]
Katzirkatchalsky et al.

[11] 3,764,670

[45] Oct. 9, 1973

[54] POLYPEPTIDIC ANTI-BIOTIC SUBSTANCES DERIVED FROM CASEIN

[75] Inventors: Aharon Katzirkatchalsky, Tel Aviv; Eitan Lahav, Rishon-le-Zion, both of Israel; Mogens Torben Sode-Morgensen, Copenhagen, Denmark

[73] Assignee: The State of Israel, Ministry of Agriculture, Jerusalem, Israel

[22] Filed: Oct. 28, 1970

[21] Appl. No.: 84,765

Related U.S. Application Data

[63] Continuation-in-part of Ser. No. 608,747, Jan. 12, 1967, abandoned.

[52] U.S. Cl. ................................ 424/118, 424/177
[51] Int. Cl. ............................................ A61b 27/00
[58] Field of Search .................................... 424/118

*Primary Examiner*—Jerome D. Goldberg
*Attorney*—Browdy and Neimark

[57] ABSTRACT

A group of novel antibiotic polypeptidic substances obtained by the reaction of casein with a proteolytic enzyme at a pH of 6 to 7.

4 Claims, 7 Drawing Figures

α Caseicidin 0.5% KBr

Whole Caseicidin in 1% KBr

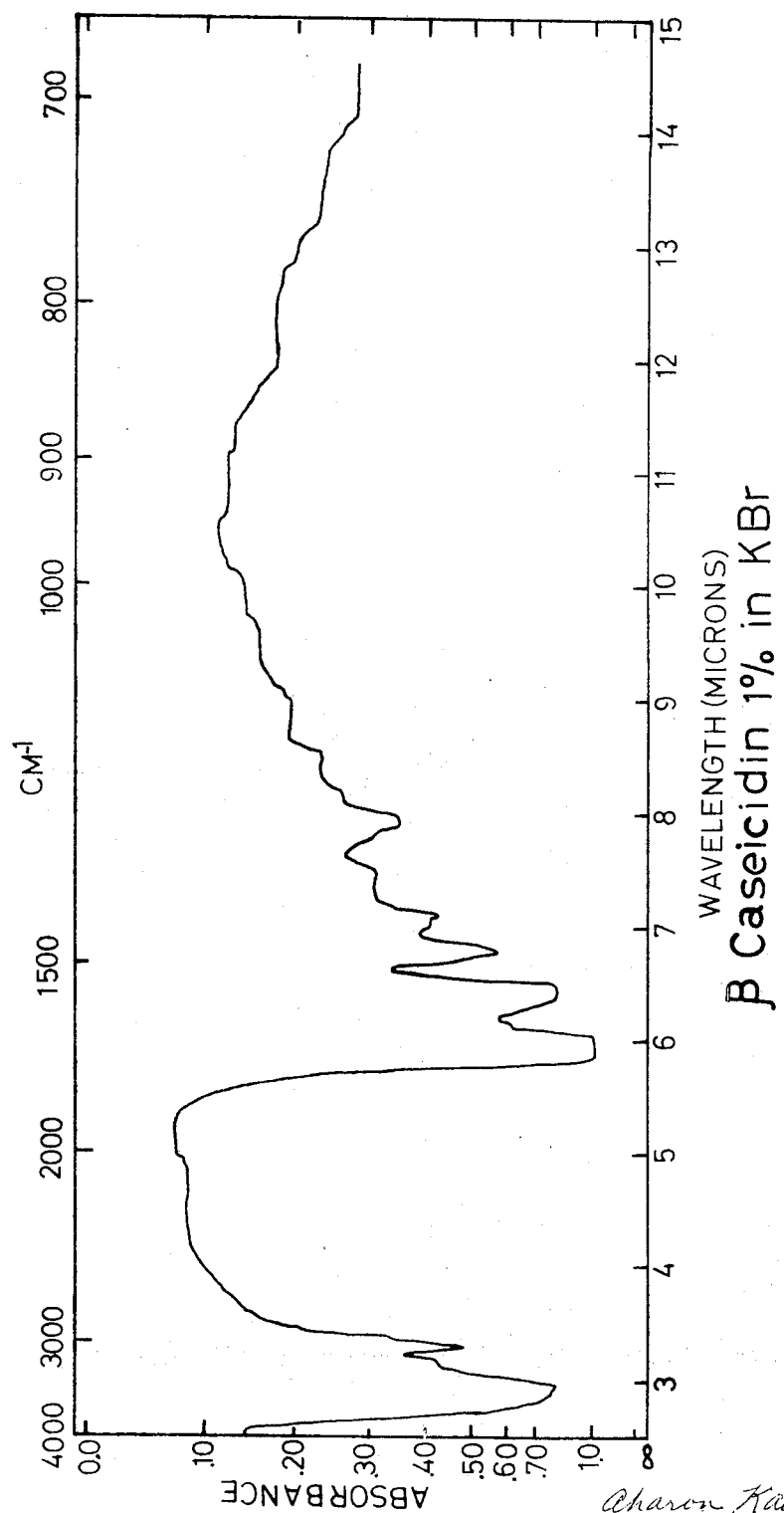

Whole Caseicidin
0.0143% Solution  Cell thickness 0.1 cm

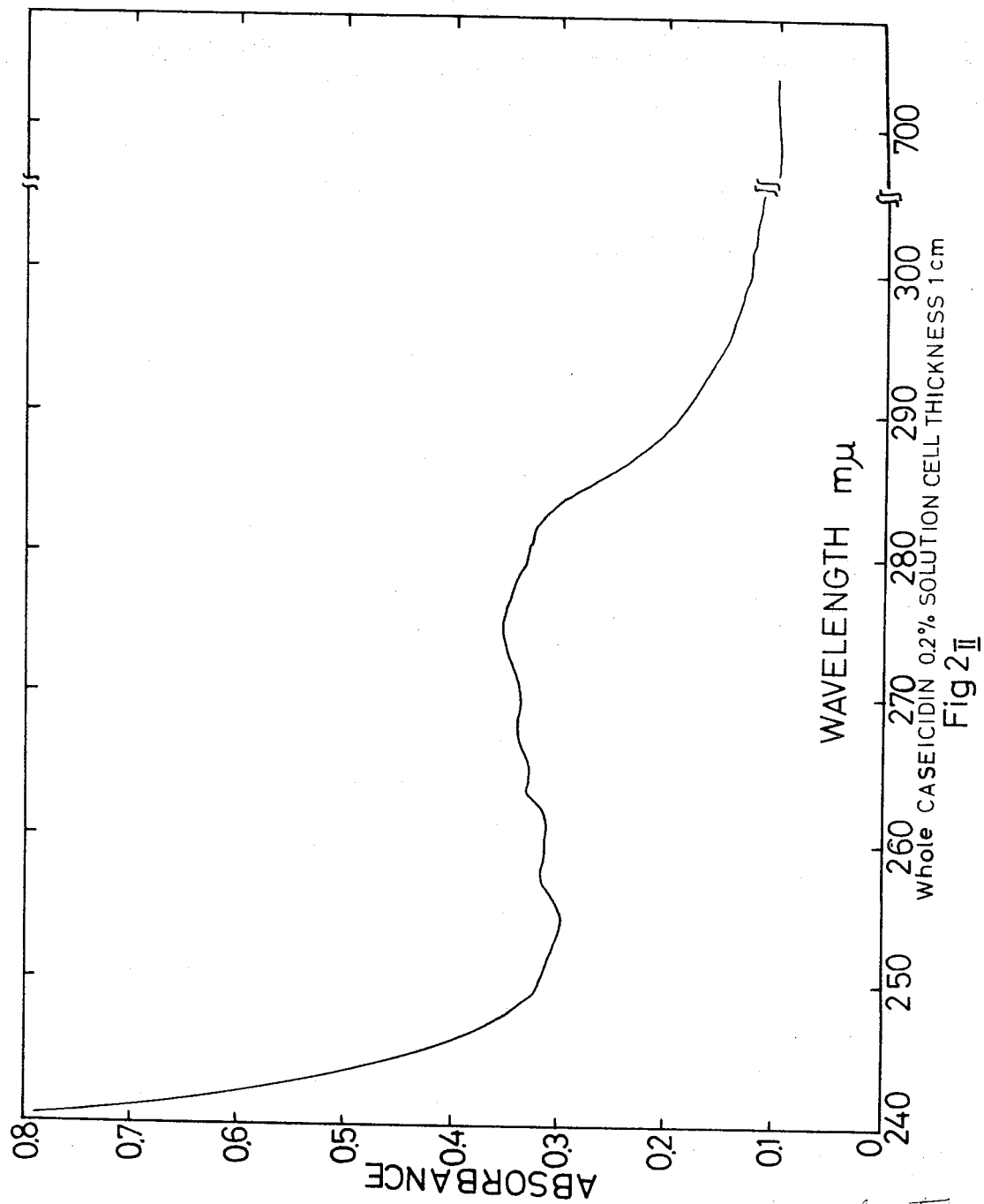

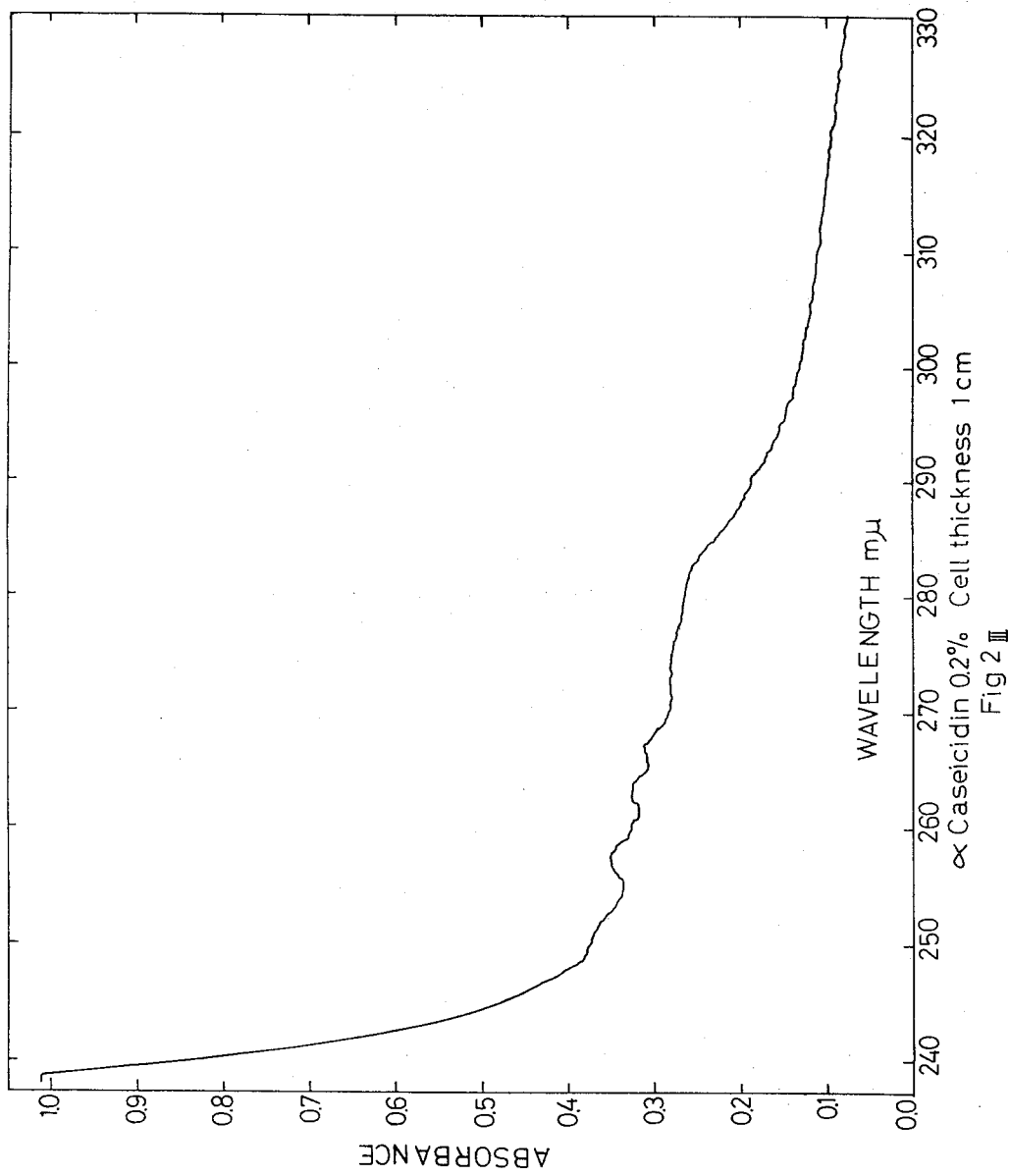

β Caseicidin 0.2% Cell thickness 1cm

POLYPEPTIDIC ANTI-BIOTIC SUBSTANCES DERIVED FROM CASEIN This is a continuation-in-part of copending, parent application Ser. No. 608,747, filed Jan. 12, 1967 now abandoned in favor of the present case.

The present invention concerns novel polypeptidic antibiotic substances derived from casein.

The souring of milk by desirable bacteria is of very great importance in the dairy industry for the production of various sour milk products, aromatic butter as well as cheeses of various types and kinds.

For a considerable time it has already been observed that the normal souring of milk is in many cases inhibited which may result either in the complete failure of the reaction or in a considerable delay. In particular in cheese making the lactic acid production by the starter may be delayed or prevented so that it is not possible to make cheese of the desired high quality or to make cheese at all. The inhibitions of the proper acid development during cheese making thus change the final properties of the cheese or prevent its production altogether.

It has also been observed that the lactic acid formation depends to a certain degree upon the properties of the milk serving as substrate material, since milk is a culture medium for the lactic acid bacteria. For long time it has been observed that cheese making processes are slowed and defects appear in the final cheese because certain milks are not suitable as culture media. The unsuitability of a certain medium as culture medium for bacteria may be the consequence of the presence of certain natural inhibitory substances and/or the lack of certain critical growth substances.

In spite of the above observations and many studies that have been made on the question of natural inhibitory and stimulatory properties in milk, no explanations of the above phenomena have so far been found. This is no doubt due to the very complex nature of milk and the fact that many strains of lactic acid bacteria used in cheese making do not behave in the same manner in this medium.

In recent years many natural polypeptides with antibacterial activities have been isolated and characterized. Thus a number of bacteria and fungi have been found to secrete cyclic antibacterial peptides such as gramicidin, tyrocidin, the polymyxins and the bacitracine. Also, leukin, which is a protamin with potent antibacterial properties, was isolated, and a basic peptide inhibiting the growth of bacteria was isolated from hog thyroid.

These and other observations have in accordance with the present invention led to the assumption that the inhibition of the development of lactic acid bacteria in milk may possibly by attributed to a natural polypeptidic substance having antibacterial properties, which is inherently present in milk in the form of a precursor from which it may, under certain conditions, be formed or liberated. The invention is based on the further assumption that if such a substance does in fact form, it may also have other antibacterial properties which may render it suitable for use in medicine. Both these assumptions were in accordance with the present invention confirmed.

In accordance with the invention there is provided a new group of antibiotic polypeptidic substances obtained by reaction of casein with a proteolytic enzyme in aqueous solution at a pH of 6 – 7.

Preferably the pH of the above reaction is selected at about 6.4.

Examples of proteolytic enzymes that can be employed in accordance with the invention are rennin, papain, pepsin and trypsin. Of these rennin is the most effective and can be used in quantities of 0.02 $\mu$g per 1 ml of a 1.7 percent aqueous casein solution.

The enzymes do not have to be used in pure form and various commercial or other compositions containing them are applicable. For example, in the case of rennin both pure rennin as well as its compositions such as commercial rennet can be used.

Hereinafter the invention will be described and exemplified with reference to the use of rennin, it being understood that this is by way of example only. Where in the following description the term "rennin" is used it is meant to cover both pure rennin as well as compositions containing rennin such as, for example, commercial rennet.

In particular there are provided in accordance with the present invention four new polypeptidic substances of antibiotic activity obtained by reacting a substance selected from the group consisting of whole casein, $\alpha$-casein, $\beta$-casein and $\gamma$-casein with a proteolytic enzyme in aqueous solution at a pH of 6 – 7, which substances are termed hereinafter respectively whole Caseicidin, $\alpha$-Caseicidin, $\beta$-Caseicidin and $\gamma$-Caseicidin, and are characterized by the following:

a. Molecular weight determined by ultracentrifugation in veronal-buffer solutions of ionic strength 0.2 and Caseicidin concentrations of 1 percent, 0.6 percent, 0.05 percent and 0.33 percent in a multichannel cell by the short column equilibrium method according to David A. Yphantis, Annals of the New York Academy of Science, Volume 88, article 3, pages 586–601, August 31, 1960.

TABLE I

| | M.W. 1% | M.W. 0.67% | M.W. 0.50% | M.W. 0.33% | M.W. (average) | M.W. 0.00% |
|---|---|---|---|---|---|---|
| Whole Caseicidin | 5137 | 5637 | 5428 | 6077 | 5569 | 6500 |
| $\alpha$-Caseicidin | 4891 | 5010 | 4965 | 5605 | 5117 | 5120 |
| $\beta$-Caseicidin | 3910 | 3950 | 4090 | 4219 | 4040 | 4250 |
| $\gamma$-Caseicidin | 5130 | 5380 | 5700 | 5690 | 5475 | 6150 | b. Total N: Whole Caseicidin 16.2 percent; $\gamma$-Caseicidin 17.2 percent; $\beta$-Caseicidin 16.1 percent; $\gamma$-Caseicidin 15.7 percent;

c. Total P: Whole Caseicidin 0.43 percent; $\alpha$-Caseicidin 0.27 percent; $\beta$-Caseicidin 0.19 percent; $\gamma$-Caseicidin 0.38 percent.

The fact that the P-content of the whole caseicidin is higher that that of each fraction is to be ascribed to impurities contained in the whole caseicidin, which are removed in the course of fractionation.

d. Compositions expressed in amounts of amino acids per 100 g. of dry matter:

TABLE II

| | Whole Caseicidin | $\alpha$-Caseicidin | $\beta$-Caseicidin | $\gamma$-Caseicidin |
|---|---|---|---|---|
| Aspartic acid | 8.17 | 9.17 | 4.91 | 6.24 |
| Threonine | 10.57 | 6.55 | 6.22 | 7.05 |
| Serine | 5.40 | 4.41 | 3.39 | 5.71 |
| Glutaric acid | 19.77 | 16.23 | 16.85 | 17.95 |

TABLE II—Continued

|  | Whole Caseicidin | α-Caseicidin | β-Caseicidin | γ-Caseicidin |
|---|---|---|---|---|
| Proline | 13.80 | 11.44 | 16.20 | 14.51 |
| Glycine | 2.36 | 2.50 | 3.59 | 3.07 |
| Alanine | 3.90 | 2.41 | 2.70 | 3.09 |
| Valine | 8.18 | 4.35 | 10.55 | 8.11 |
| Isoleucine | 8.04 | 5.71 | 7.08 | 6.07 |
| Leucine | 6.51 | 9.30 | 6.52 | 6.36 |
| Tyrosine | 1.94 | 3.42 | 3.59 | 5.16 |
| Phenylalanine | 2.74 | 3.42 | 4.38 | 4.13 |
| NH$_3$ | 1.60 | 1.70 | 1.40 | 1.60 |
| Lysine | 6.72 | 6.74 | 4.41 | 4.62 |
| Histidine | 2.53 | 4.48 | 1.49 | 1.37 |
| Arginine | 3.76 | 4.95 | 4.83 | 2.72 |
| Total | 105.99 | 96.78 | 98.11 | 97.76 |

The elementary analysis of the caseicidins is as follows:

TABLE III

ELEMENTARY ANALYSIS:
Whole Caseicidin:    N 16.2%   P 0.43%   C 52.1%
                     O 24.4%   H 7.3%
α-caseicidin:        N 17.2%   P 0.27%   C 52.8%
                     O 22.7%   H 7.3%
β-caseicidin:        N 16.1%   P 0.19%   C 53.8%
                     O 22.6%   H 7.4%
γ-caseicidin:        N 15.7%   P 0.38%   C 53.0%
                     O 24.0%   H 7.3%

Figure 2I:
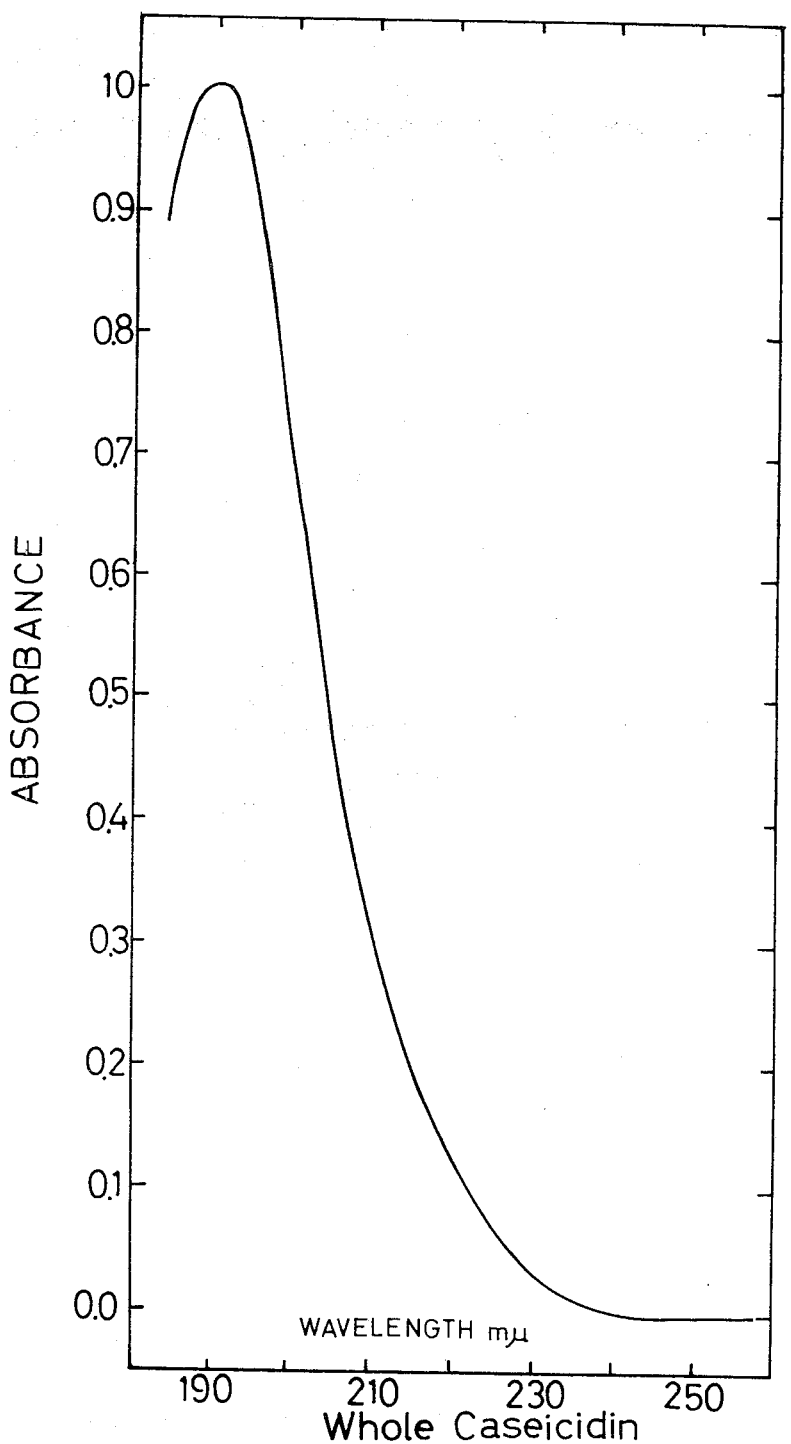
Figure 2:
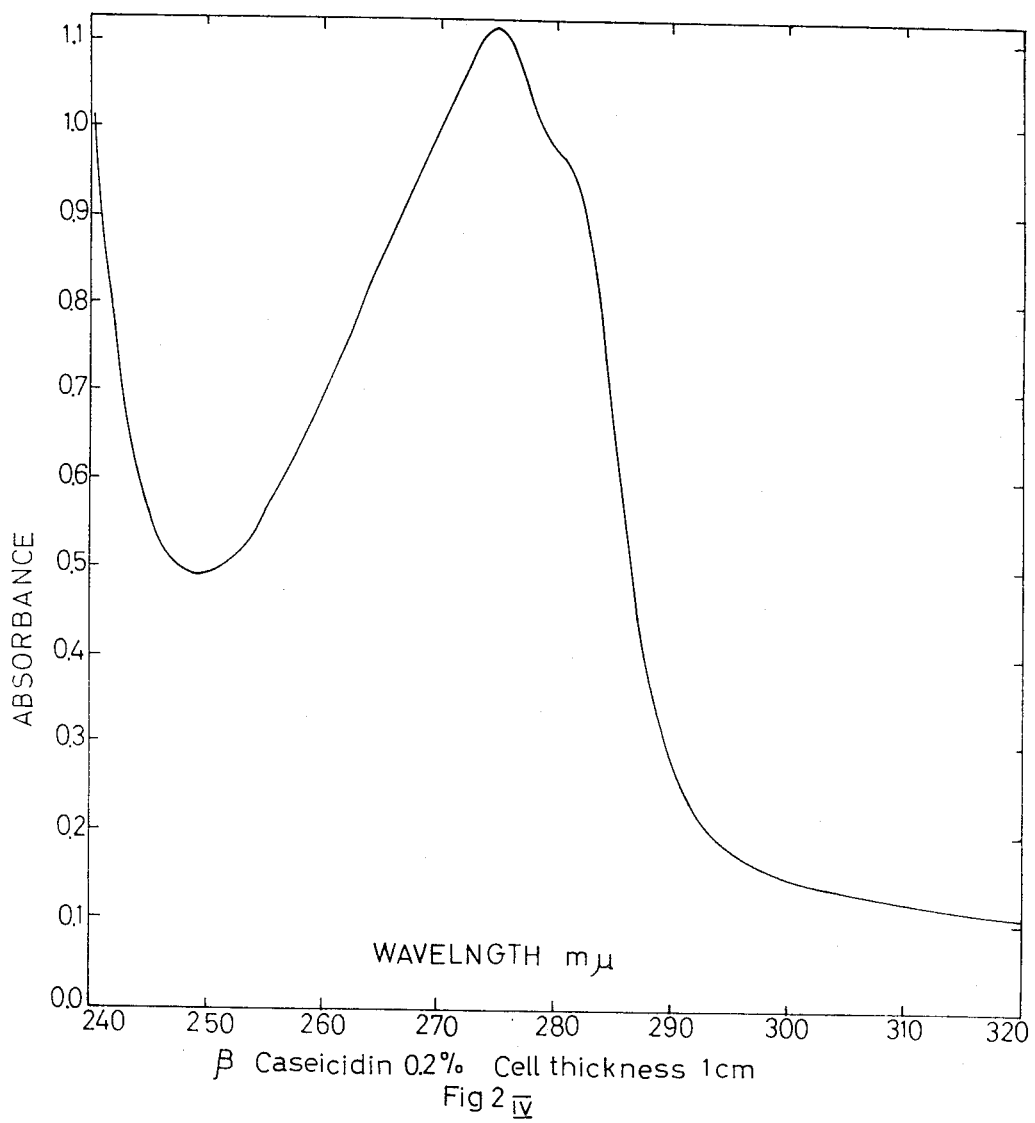

FIG. 1 shows the infra-red absorption spectra; and FIG. 2 shows the ultra-violet absorption spectra. From FIG. 1 it will be seen that there are only two pronounced absorption bands, one around three microns and the other around six microns. These bands are non-specific and are typical of CONH peptide bonds in general and are to be found in the I.R. spectra analysis of any peptide.

From the ultra-violet spectra shown in FIG. 2, it is seen that all of the caseicidins have a UV absorption peak at 190 m$\mu$ which is non-specific and typical for peptide bonds. Measurements with the caseicidins in one cm. cells using solutions of 1 mg./ml. gave the following results:

Whole Caseicidin - has an absorption in the region of 255–283 m$\mu$. with optical density of 0.2;
α-caseicidin - has a slight absorption between 250 – 290 m$\mu$. with optical density of 0.5;
β-caseicidin - peak at 275 m$\mu$. and shoulder about 280 m$\mu$. with optical density of 0.2.

In accordance with the invention whole Caseicidin is obtained from whole casein, α-Caseicidin from α-casein, β-Caseicidin from β-casein and γ-Caseicidin from γ-casein. The separate isolation of the various caseins from milk is known per se from the literature. Thus, for example, whole casein is precipitated at room temperature from fresh unpasteurized skim milk by slowly adjusting the pH of the latter to 4.6 with 0.25N HCl. The precipitated casein is filtered through a cheese cloth and washed several times with distilled water by suspending each time in an adequate volume of water and refiltering.

Purified α- and β-caseins can be prepared by the urea method according to Hipp et al J. Dairy. Sci. 35, 272–281 and the purified γ-casein can be prepared by the alcohol method of Hipp et al J. Amer. Chem. Soc. 72, 4928–4931. This method may be modified somewhat in order to improve the yield as described by E. Lahav in Special Bulletin No. 72 of August 1964 published by the National and University Institute of Agriculture, the Volcani Institute of Agricultural Research, Rehovoth, Israel.

From each of the four caseins the corresponding Caseicidin is prepared by reaction with a proteolytic enzyme, e.g. rennin. The enzyme is added to a homogeneous aqueous casein solution and the reaction mixture is then incubated at about 30°C. Where the enzyme is rennin, which is used in an amount of 0.02 $\mu$g. per 1 ml. of a 1.7 percent aqueous casein solution, the incubation time is of the order of from about two hours to about 14 hours. In cases of other, less potent enzymes the incubation time is longer and/or larger quantities of enzyme were required.

When the reaction is completed the solution is heated to 80°C. for three minutes in order to activate the enzyme, is then cooled to room temperature and to the cooled solution an inorganic acid or a suitable organic acid such as, for example, acetic acid or trichloro acetic acid (TCA) is added. Of these acids TCA is particularly effective and may be added to the above cooled solution in form of an 8 percent aqueous solution until the pH is lowered to about 1.25. Where the acid is an inorganic one or acetic acid the amount that is added must be so controlled that the pH does not drop below about 4.6.

By the addition of acid paracaseinate is precipitated. The precipitated paracaseinate is removed by centrifugation and the supernatant is purified by dialysis against distilled water at 2°C. whereby the salts and low-molecular organic compounds dissolved in the supernatant are removed. The solution thus purified contains the caseicidins and some glucopeptide, which latter is a known fraction previously isolated and described. From this solution the caseicidins are precipitated by the addition of so much TAC that the final TCA concentration of the peptide solution becomes about 10 to 12 percent by weight. By this addition the caseicidins are precipitated while the glucopeptide remains dissolved. The caseicidin precipitate is filtered off and dissolved in so much aqueous sodium hydroxide that the pH of the solution becomes about 7. The sodium trichloroacetate thereby formed is removed by dialysis and from the solution thus purified the caseicidins are retrieved by freeze-drying.

For antibiotic use of the caseicidins it is, however, possible to retain the glucopeptide associated with the caseicidins, in which case the operation of separating the latter from the former can be omitted.

The antimicrobial activity of the four Caseicidins was measured in vitro in order to determine:

a. the potency of the Caseicidins as antibacterial agents; and
b. the sensitivity of a given micro-organism to known concentrations of Caseicidins.

Because of the relatively large molecular size of Caseicidins the serial broth dilution test was applied in preference over the diffusion method.

Several dilutions of the various Caseicidins were made in 4 ml. broth pepton and inoculated with test organism: Sarcian lutea, Staphylo-coccus aureus, Bacillus subtilis and Bacillus stearothermophilus.

The inoculum (400,000 bact./ml) was usually 0.1 ml of a 20 hours old broth culture. The tubes were incubated for 72 hours and after incubation the degree of inhibition of the growth of the organism was noted for each concentration of the Caseicidin, expressed in terms of micrograms of substance per milliliter of broth pepton.

The following were the results:

TABLE IV
Total number of bacteria per milliliter medium after 72 h. incubation, in thousands of bacteria

| | Concent. in µg/ml | Sarcina lutea | Staphylo- coccus aureus | Bac. subtilis | Bac. stearother- mophilus |
|---|---|---|---|---|---|
| Control | | 66.000 | 32.000 | 46.000 | 17.000 |
| Whole Caseicidin | 10 | 66.000 | 33.000 | 46.000 | 18.000 |
| | 100 | 66.000 | 32.000 | 38.000 | 17.000 |
| | 500 | 64.000 | 32.000 | 32.000 | 17.000 |
| | 1000 | 64.000 | 31.000 | 0 | 17.000 |
| | 1600 | 52.000 | 32.000 | 0 | 16.000 |
| | 2000 | 11.000 | 0 | 0 | 0 |
| α-Caseicidin | 10 | 66.000 | 31.000 | 42.000 | 19.000 |
| | 100 | 66.000 | 32.000 | 38.000 | 19.000 |
| | 500 | 66.000 | 31.000 | 19.000 | 18.000 |
| | 1000 | 68.000 | 30.000 | 0 | 17.000 |
| | 2000 | 42.000 | 0 | 0 | 0 |
| β-Caseicidin | 10 | 62.000 | 32.000 | 44.000 | 19.000 |
| | 100 | 2.000 | 22.000 | 2.000 | 19.000 |
| | 500 | 0 | 0 | 0 | 18.000 |
| | 1000 | 0 | 0 | 0 | 0 |
| γ-Caseicidin | 10 | 66.000 | 32.000 | 42.000 | 18.000 |
| | 100 | 66.000 | 32.000 | 42.000 | 19.000 |
| | 500 | — | 32.000 | 42.000 | 19.000 |
| | 1000 | — | 0 | 42.000 | 0 |

—means no experiments have been carried out.
0 means no growth at all.

Similar inhibitory effects of the Caseicidins in a concentration of 125 µg/ml were established with respect to Diplococcus pneumonia and Streptococcus pyogenes.

The Caseicidins can, accordingly, be used for the preparation of ointments for external use against Staphylococcus aureus and Streptococcus pyogenes. For example, ointments including 2000 mg of whole Caseicidin or alpha-caseicidin per ml. of ointment, or in concentrations of 1000 mg of beta-caseicidin or gamma-caseicidin per ml. of ointment can be provided.

A bactericidal effect was established according to the methods of S.D. Elek and G.R.F. Hilson, Y.S. Chabbert and J.C. Patte, and L.P. Garrod and T.M. Waterworth, as all described by K.R. Erikson, M.D. Thesis, Copenhagen, 11th October, 1965, Universitetets Institut for ALM: Pathologi. Upon combination of the Caseicidins with Penicillins a synergistic effect was produced, determined according to J. Lederberg and E.M. Lederberg as described by K.R. Eriksen, loc. cit.

Toxicity tests were conducted by intraperitoneal injections to mice and guinea pigs, and the Caseicidins were found to be non-toxic in concentrations of up to 200 mg/kg body weight.

Upon repeated injections to the same animals at intervals of 10 – 16 days no symptoms of anaphylaxis and allergic reactions of any kind were observed.

It could further be established in accordance with the invention that Caseicidins are in fact responsible for the irregularities mentioned hereinbefore, occurring occasionally in the production of cheese and other dairy products as a result of total or partial inhibition of the development of lactic acid bacteria. For showing this serial dilutions of the various Caseicidins were made in 100 ml. of raw skim milk pasteurized by heating to 85°C. for a short moment and cooled thereafter to 30°C. Each portion of milk so prepared was inoculated with 1 ml. of commerical Chr. Hansens cheese starter and incubated at 30°C for six hours. After incubation the soured milk was titrated and the developed acid noted in terms of ml of 0.1N NaOH used for the titration of 100 ml of soured milk. The following were the results:

TABLE V

| Concent. in µg per ml milk | Titer after 6 hours incubation at 30°C expressed as ml 0.1N NaOH per 100 ml milk containing Caseicidins | | | |
|---|---|---|---|---|
| Caseicidin: | Whole | α | β | γ |
| 0 | 69.0 | 69.0 | 69.0 | 69.0 |
| 10 | 69.0 | 69.5 | 69.0 | 70.5 |
| 20 | | | | 71.0 |
| 30 | | | 69.0 | |
| 40 | | | | 71.5 |
| 50 | | | 69.5 | |
| 60 | | | | 72.0 |
| 70 | | | 70.5 | |
| 80 | | | | 72.5 |
| 100 | 69.0 | 69.0 | 72.0 | 74.0 |
| 150 | | | | 74.5 |
| 200 | 69.5 | 64.0 | 70.0 | |
| 250 | | | | 63.0 |
| 300 | 69.0 | | | |
| 400 | 67.5 | 59.0 | 69.0 | |
| 500 | 63.0 | | | 50.0 |
| 600 | | 54.0 | 67.5 | |
| 800 | | 47.0 | 66.5 | |
| 1000 | 61.0 | 44.0 | 64.5 | 38.0 |
| 1600 | 55.0 | | | |
| 2000 | 52.0 | 40.0 | 48.0 | |

It follows from the above Table V that small amounts of whole Caseicidin and α-Caseicidin do not affect the souring of the milk at all. However, as those concentrations that are actually found in renneted milk are reached, the lactic acid production by the starter is reduced which clearly indicates an antimicrobial activity of the Caseicidins. It is also seen from the Table that small concentrations of β- and γ-Caseicidins even stimulate to a certain extent the activity of the lactic acid bacteria but as the concentrations increase these Caseicidins also act as antibacterial agents.

It can be concluded from the above Table V that both the absolute amounts of each of the Caseicidins as well as their relative proportions determine the rate of souring of the milk and while in some cases there will be no effect or even a certain stimulation, in other cases a clear inhibition will occur. Accordingly, to control milk souring in the manufacture of cheese, one may add one of the four Caseicidins in order to kill the lactic acid bacteria and in this way to prolong the duration of the cheese making; if enough Caseicidin is added, such bacteria are completely destroyed and no cheese will form. By the same token, if nutritional substances such as peptic or algenic acid are added to the reaction mixture to combine with Caseicidin thereby to render it ineffective, the destruction of the lactic acid bacteria is reduced or even completely prevented whereby duration of the cheese production is shortened.

Both the absolute quantities of the Caseicidins in the milk as well as their relative proportions depend on the renneting, since it is only upon the renneting that these antibacterial substances are produced from the casein. This in accordance with the invention was confirmed as follows:

100 Ml. serial portions of raw skim milk were treated with 0.03 ml. of Chr. Hansens commercial rennet which corresponds to the amount practically used in cheese making. After incubation at 30°C. for various periods of time ranging between one and 10 minutes the enzyme was inactivated by heating to 80°C. for three minutes. After an incubation for more than 10 minutes the milk coagulates upon heating to 80°C. and therefore the results after said longer incubation periods could not be examined. After the above treatment the milk was cooled to 30°C., inoculated with one ml of cheese starter and incubated for six hours at 30°C.

For control purposes the same procedure was followed with rennet and rennin which have before been inactivated.

The developed acid was noted and recorded as in the previous experiments. The results are given in the following Table:

TABLE VI

The effect of short-time action of rennet and rennin on the souring capacity of milk Titer as ml. 0.1 N NaOH per 100 ml

| Duration of Action in minutes | Milk with rennet | Milk with rennin |
| --- | --- | --- |
| 1 | 70.5 | 73.5 |
| 2 | 73.5 | 74.0 |
| 3 | 74.0 | 75.0 |
| 4 | 74.5 | 75.5 |
| 5 | 72.0 | 70.0 |
| 10 | 66.0 | 66.5 |
| Control | 69.5 | 72.0 |

It can be seen from the above Table VI that already after one minute of treating the milk with rennet as well as with rennin there occurs a stimulation of acid development and this stimulation increases, reaches a peak after four minutes and thereafter there occurs a significant inhibition. It should in this connection be remembered that milk has a strong buffer capacity and therefore the recorded inhibition is very significant.

The invention is further illustrated by the following Examples to which it is not limited:

Example 1 - Production of Whole Casein

The whole casein was precipitated at room temperature from 50 liters of fresh unpasteurized skim milk by slowly adjusting the pH to 4.6 with 11 liters of 0.25N HCl. The precipitated casein was filtered through a cheese cloth and washed five times with distilled water by suspending each time in a volume of 75 liters of water and filtering through a cheese cloth.

Example 2 - Production of $\alpha$- and $\beta$-Casein 1,500 g. of wet whole casein (400 g dry weight) was dissolved by the addition of 2,259 g of urea and water making a total of 5.700 liters and yielding a urea concentration of 6.6 M.

To the above solution there was added at room temperature slowly and while stirring 2.425 liters of water bringing the urea concentration down to 4.63 M. The precipitate that formed under these conditions was mainly $\alpha$-casein which was removed by centrifugation. The crude $\alpha$-casein was further purified by dissolving it in 1,500 ml of a 6.6 M urea solution containing also 15.9 g of NaCl. From the solution pure $\alpha$-casein was precipitated by the addition of 1,500 ml of water and the precipitate was filtered off and washed with a 4.7 M urea solution. In order to remove traces of $\beta$-casein the product was again dissolved in an aqueous urea solution and reprecipitated as before. Urea was removed from the product by washing with an excess of water. After drying 150 g of pure $\alpha$-casein was obtained.

The filtrate obtained after the removal of the precipitated $\alpha$-casein and being 4.63 molar in urea, was diluted down to 3.3 M urea by the addition of distilled water. There resulted a small precipitate which was a mixture of $\alpha$- and $\beta$-casein in about the same proportion in which they occur in the unfractionated casein. This precipitate was removed by centrifugation and discarded. The remaining filtrate which contained dissolved therein the $\beta$-casein and which was 3.3 M in urea was diluted to a urea molarity of 1.7 and at the same time the pH was adjusted to 4.7 by the addition of about 20 ml of 0.1N HCl. The precipitated crude $\beta$-casein was purified by dissolution in two liters of a 4.6 M aqueous urea solution and fractionation by elution with water. Again, the portion soluble in a 3.3 M urea solution but insoluble in a 1.7 M urea solution contained the purest $\beta$-casein. By reprecipitation in this manner the remaining small amount of $\alpha$-casein was removed and 60 g of pure $\beta$-casein was obtained.

Example 3 - Production of $\gamma$-Casein

Approximately 1,000 g (dry weight) of wet whole casein was suspended in water and dissolved by the slow addition of 0.1N NaOH to give a 7 percent solution of whole casein of pH 6.9. After standing overnight, an equal volume of absolute alcohol was added slowly with stirring. $\alpha$ and $\beta$-casein were precipitated by the slow addition of 0.1N HCl in 50 percent alcohol to give a pH of 5.7. The precipitate was removed by centrifugation at room temperature. The supernatant was cooled to 2°C and after standing overnight $\gamma$-casein precipitated. The precipitate was removed by centrifugation at 2°C and dissolved in two liters of 50 percent alcohol at room temperature and reprecipitated at 2°C as before. The precipitate was removed by centrifugation at 2°C and the product was dried with a mixture of equal volumes of acetone and ether at room temperature. 8 g of pure $\gamma$-casein was obtained.

Example 4 - Production of the Caseicidins

The production of whole, $\alpha$- $\beta$- and $\gamma$-Caseicidin proceeds in an analogous manner from the respective casein serving as starting material, as follows:

A 1.7 percent solution of the casein serving as starting material is prepared by first preparing a homogeneous casein-water suspension through thorough mixing of the casein with water in a mortar. The calculated amount of 0.1N NaOH is then slowly added with vigorous stirring. In order to dissolve the casein and bring the solution to a pH of 6.4 there is required for whole, $\alpha$-, $\beta$- and $\gamma$-casein an amount of, respectively, 0.5, 0.5, 0.45 and 0.35 milliequivalent of NaOH for each gram of moisture free casein. In order to bring about complete dissolution the mixture must be left standing for several hours with regular trituration. After the casein has been completely dissolved the remaining undissolved impurities are removed by centrifugation.

To the resulting solution there is added crystallized rennin in an amount of 0.02 microgram for each ml of solution and the resulting reaction solution is incubated at 30°C for two to 14 hours. At the end of this period the solution is heated to 80°C in order to inactivate the enzyme. After cooling down to room temperature an 8 percent trichloro-acetic acid solution (TCA) is added to the reaction mixture in a ratio of reaction solution: TCA = 3:1 yielding a final concentration of the trichloro acetic acid in the reaction solution of 2 percent. The resulting precipitate is removed by centrifugation and the supernatant which contains the desired Caseicidin is dialyzed against distilled water at 2°C. for 72 hours, changing the water every 12 hours. Each time there is used a portion of 30 volumes of distilled water for each volume of Caseicidin solution making a total of 180 volumes of water. After the dialysis is completed the solution is freeze-dried.

By proceeding in this manner the yields are as follows:

Whole Caseicidin from 1.5 liters of a 1.7 percent starting solution of whole casein - about 1.5 g.

α-Caseicidin from 1.5 liters of a 1.7 percent starting solution of α-casein - about 1.2 g.

β-Caseicidin from 1.5 liters of a 1.7 percent starting solution of β-casein - about 0.9 g.

γ-Caseicidin from 0.250 liter of a 1.7 percent starting solution of γ-casein - about 0.2 g.

The novel antibiotics according to the invention can be produced in form of pharmaceutical compositions by admixing them with suitable diluents, carriers and the like. They can, furthermore, be combined with other antibiotic substances such as, for example, various penicillins.

What is claimed is:

1. An antibiotic polypeptidic substance, termed herein whole Caseicidin, characterized by
    a. Molecular weight determined by ultracentrifugation in veronal-buffer solutions of ionic strength 0.2 and Caseicidin concentrations of 1.0 percent, 0.67 percent, 0.50 percent and 0.33 percent in a multichannel cell by the short column equilibrium method:

|  | M.W. 1% | M.W. 0.67% | M.W. 0.50% | M.W. 0.33% | M.W. (average) | M.W. 0.00% |
|---|---|---|---|---|---|---|
| Whole Caseicidin | 5137 | 5637 | 5428 | 6077 | 5569 | 6500 | b. Total N: 16.2 percent
c. Total P: 0.43 percent
d. Composition expressed in grams of amino acids per 100 gram of dry matter:

| Aspartic acid | 8.17 |
| Threonine | 10.57 |
| Serine | 5.40 |
| Glutamic acid | 19.77 |
| Proline | 13.80 |
| Glycine | 2.36 |
| Alanine | 3.90 |
| Valine | 8.18 |
| Isoleucine | 8.04 |
| Leucine | 6.51 |
| Tyrosine | 1.94 |
| Phenylalanine | 2.74 |
| NH₃ | 1.60 |
| Lysine | 6.72 |
| Histidine | 2.53 |
| Arginine | 3.76 |
| Total | 105.99 | e. Total C: 52.1 percent
f. Total H: 7.3 percent
g. Total O: 24.4 percent
h. pronounced absorption bands in the infra-red region at three microns and at six microns as set forth in FIG. 1$_I$
i. absorption peak in the ultra-violet region at 190 mμ with absorption region between 255–283 mμ. with an optical density of 0.2.

2. An antibiotic polypeptidic substance, termed herein β-Caseicidin, characterized by
    a. Molecular weight determined by ultracentrifugation in veronal-buffer solutions of ionic strength 0.2 and Caseicidin concentrations of 1.0 percent, 0.67 percent, 0.50 percent and 0.33 percent in a multichannel cell by the short column equilibrium method:

|  | M.W. 1% | M.W. 0.67% | M.W. 0.05% | M.W. 0.35% | M.W. (average) | M.W. 0.00% |
|---|---|---|---|---|---|---|
| α-Caseicidin | 4891 | 5010 | 4965 | 5605 | 5117 | 5120 | b. Total N: 17.2 percent
c. Total P: 0.27 percent
d. Composition expressed in grams of amino acids per 100 gram of dry matter:

| Aspartic acid | 9.17 |
| Threonine | 6.55 |
| Serine | 4.41 |
| Glutamic acid | 16.23 |
| Proline | 11.44 |
| Glycine | 2.50 |
| Alanine | 2.41 |
| Valine | 4.35 |
| Isoleucine | 5.71 |
| Leucine | 9.30 |
| Tyrosine | 3.42 |
| Phenylalanine | 3.42 |
| NH₃ | 1.70 |
| Lysine | 6.74 |
| Histidine | 4.48 |
| Arginine | 4.95 |
| Total | 96.78 | e. Total C: 52.8 percent
f. Total H: 7.3 percent
g. Total O: 22.7 percent
h. pronounced absorption bands in the infra-red region at 3 microns and at 6 microns as set forth in FIG. 1$_{II}$
i. absorption peak in the ultra-violet region at 190 mμ with a slight absorption in the region of 250–290 mμ.

3. An antibiotic polypeptidic substance, termed herein β-Caseicidin, characterized by
    a. Molecular weight determined by ultracentrifugation in veronal-buffer solutions of ionic strength 0.2 and of Caseicidin concentrations of 1.0 percent, 0.67 percent, 0.50 percent and 0.33 percent in a multichannel cell by the short column equilibrium method:

|  | M.W. 1% | M.W. 0.67% | M.W. 0.50% | M.W. 0.33% | M.W. (average) | M.W. 0.00% |
|---|---|---|---|---|---|---|
| β-Caseicidin | 3910 | 3950 | 4090 | 4210 | 4040 | 4250 | b. Total N: 16.1 percent
c. Total P: 0.19 percent
d. Composition expressed in gram of amino acids per 100 gram of dry matter:

| Aspartic acid | 4.91 |
| Threonine | 6.22 |
| Serine | 3.39 |
| Glutamic acid | 16.85 |
| Proline | 16.20 |
| Glycine | 3.59 |
| Alanine | 2.70 |
| Valine | 10.55 |
| Isoleucine | 7.08 |
| Leucine | 6.52 |
| Tyrosine | 3.59 |
| Phenylalanine | 4.38 |
| NH₃ | 1.40 |
| Lysine | 4.41 |
| Histidine | 1.49 |
| Arginine | 4.83 |
| Total | 98.11 | e. Total C: 53.8 percent
f. Total H: 7.4 percent
g. Total O: 22.6 percent
h. pronounced absorption bands in the infra-red region at three microns and at six microns as set forth in FIG. 1$_{III}$ i. absorption peak in the ultra-violet region at 190 mμ with a peak at 275 mμ and a shoulder around 280 mμ. with an optical density of 0.2.

4. Gamma-Caseicidin, produced by the process of providing a homogeneous aqueous gamma-casein solution, adding to said aqueous gamma-casein solution rennin used in an amount of 0.02 micrograms per ml. of a 1.7 percent aqueous casein solution and at a pH of 6 – 7, incubating the resultant mixture at about 30°C. from about two hours to about 14 hours until the reaction is complete, heating the resultant solution to about 80°C. for about three minutes in order to inactivate the enzyme, cooling the solution to room temperature, adding an 8 percent trichloroacetic acid solution to yield a final concentration of trichloroacetic acid in the reaction solution of 2 percent or until the pH is lowered to about 1.25, thereby causing precipitation of acid paracaseinate, removing the supernatant liquid and purifying said supernatant liquid by dialysis against distilled water at about 2°C. for 72 hours to remove salts and low molecular organic compounds, and recovering the gamma-Caseicidin by freeze drying, said gamma-Caseicidin being characterized by a. Molecular weight determined by ultracentrifugation in veronal buffer solutions of ionic strength 0.2 and Caseicidin concentrations of 1.0 percent, 0.67 percent, 0.50 percent and 0.33 percent in a multichannel cell by the short column equilibrium method:

|  | M.W. 1% | M.W. 0.67% | M.W. 0.50% | M.W. 0.33% | M.W. (average) | M.W. 0.00% |
|---|---|---|---|---|---|---|
| γ-Caseicidin | 5130 | 5380 | 5700 | 5690 | 5475 | 6150 | b. Total N: 15.7 percent
c. Total P: 0.38 percent
d. Composition expressed in gram of amino acids per 100 gram of dry matter:

| Aspartic acid | 6.24 |
| Threonine | 7.05 |
| Serine | 5.71 |
| Glutamic acid | 17.05 |
| Proline | 14.51 |
| Glycine | 3.07 |
| Alanine | 3.09 |
| Valine | 8.11 |
| Isoleucine | 6.07 |
| Leucine | 6.36 |
| Tyrosine | 5.16 |
| Phenylalanine | 4.13 |
| $NH_3$ | 1.60 |
| Lysine | 4.62 |
| Histidine | 1.37 |
| Arginine | 2.72 |
| Total | 97.76 | e. Total C: 53.0 percent
f. Total H: 7.3 percent
g. Total O: 24.0 percent
h. pronounced absorption bonds in the infra-red region at three microns and at six microns.

* * * * *